United States Patent
Hwang

(10) Patent No.: US 10,728,725 B2
(45) Date of Patent: Jul. 28, 2020

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Junsik Hwang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/183,208

(22) Filed: Nov. 7, 2018

(65) Prior Publication Data
US 2020/0053530 A1 Feb. 13, 2020

(30) Foreign Application Priority Data
Aug. 7, 2018 (KR) .................. 10-2018-0091746

(51) Int. Cl.
*H04W 4/46* (2018.01)
*H04W 12/04* (2009.01)
*H04W 12/08* (2009.01)
*H04L 29/06* (2006.01)
*H04L 29/08* (2006.01)
*H04L 9/08* (2006.01)
*G07C 5/08* (2006.01)

(52) U.S. Cl.
CPC ............. *H04W 4/46* (2018.02); *G07C 5/085* (2013.01); *H04L 9/0894* (2013.01); *H04L 63/10* (2013.01); *H04L 67/12* (2013.01); *H04W 12/04* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 8,977,427 B2 | 3/2015 | Scott | |
| 2011/0130905 A1* | 6/2011 | Mayer | G07C 5/008 701/22 |
| 2012/0194679 A1* | 8/2012 | Nehowig | G06F 1/1626 348/148 |

(Continued)

FOREIGN PATENT DOCUMENTS

| | | |
|---|---|---|
| JP | 2017-162043 A | 9/2017 |
| KR | 10-0992652 B1 | 11/2010 |

(Continued)

*Primary Examiner* — Mohammed Rachedine
(74) *Attorney, Agent, or Firm* — Brinks Gilson & Lione

(57) ABSTRACT

A vehicle and a method for controlling the same to prevent manipulation of odometer information by creating a network with another vehicle and sharing odometer information of a cluster with the other vehicle in the network. The vehicle includes: a cluster to obtain odometer information updated as the vehicle runs; a communication device to form a network with the other vehicle; a controller to generate cluster information to include a vehicle identification number, a cluster identification number, and odometer information, send the cluster information to the other vehicle using the network, and control the communication device to receive cluster information of the other vehicle; and a storage to store network information including the cluster information of the vehicle and the cluster information of the other vehicle.

18 Claims, 10 Drawing Sheets

(56) References Cited

U.S. PATENT DOCUMENTS

| | | | | |
|---|---|---|---|---|
| 2012/0296513 A1* | 11/2012 | Ramseyer | .............. | G06Q 10/02 |
| | | | | 701/29.6 |
| 2013/0304276 A1* | 11/2013 | Flies | ...................... | G06F 17/00 |
| | | | | 701/1 |
| 2013/0317694 A1* | 11/2013 | Merg | ..................... | G07C 5/008 |
| | | | | 701/31.6 |
| 2015/0105941 A1* | 4/2015 | Pandya | ................. | G07C 5/008 |
| | | | | 701/2 |
| 2018/0089909 A1 | 3/2018 | Abuelsaad et al. | | |
| 2018/0211546 A1* | 7/2018 | Smartt | ................. | G05D 1/0088 |

FOREIGN PATENT DOCUMENTS

| | | | |
|---|---|---|---|
| KR | 10-1458713 | B1 | 10/2014 |
| KR | 10-1459953 | B1 | 11/2014 |
| KR | 10-1550991 | B1 | 9/2015 |
| KR | 10-1557283 | B1 | 9/2015 |

* cited by examiner

FIG. 3A

| VEHICLE TYPE | VEHICLE IDENTIFICATION NUMBER | CLUSTER IDENTIFICATION NUMBER | ODOMETER INFORMATION | UPTATE DATE |
|---|---|---|---|---|
| 100 | 123456789 | 123ABC | 1234KM | 20180325 / 18:30:25 |
| 110 | 123456780 | 132ABD | 123lKM | 20180326 / 18:30:25 |
| 120 | 123456770 | 132ABF | 1677KM | 20180326 / 15:30:37 |
| 130 | 123456760 | 132ABG | 18756KM | 20180327 / 08:30:14 |
| 140 | 123456750 | 132ABH | 2785KM | 20180325 / 12:30:25 |

| VEHICLE TYPE | VEHICLE IDENTIFICATION NUMBER | CLUSTER IDENTIFICATION NUMBER | ODOMETER INFORMATION | UPTATE DATE |
|---|---|---|---|---|
| 100 | 123456789 | 123ABC | 1234KM | 20180325 / 18:30:25 |
| 110 | 123456780 | 132ABD | 1231KM →1250KM | 20180326 / 18:30:25 → 20180327 / 12:30:05 |
| 120 | 123456770 | 132ABF | 1677KM | 20180326 / 15:30:37 |
| 130 | 123456760 | 132ABG | 18756KM | 20180327 / 08:30:14 |
| 140 | 123456750 | 132ABH | 2785KM | 20180325 / 12:30:25 |

| Data Byte | Parameter Name | Cvt | Hex Value |
|---|---|---|---|
| #1 | Service ID (WriteDataByIdentifier Request) | M | 2E |
| #2<br>#3 | Local ID (RecordLocalIdentifier) | M<br>M | 00<br>80 |
| #4-8 | dataRecord[ ] #1<br>= [USER IDENTIFICATION NUMBER] | M | xx xx xx xx xx |
| #9-12 | dataRecord[ ] #2<br>= [CLUSTER IDENTIFICATION NUMBER] | U | yy yy yy yy |
| #13-16 | dataRecord[ ] #3<br>= [USER'S PRIVATE KEY INFORMATION] | U | zz zz zz zz |
| #17 | Checksum | U | ss |

700

710
720
730

VEHICLE AND METHOD FOR CONTROLLING THE SAME

CROSS-REFERENCE TO RELATED APPLICATION

This application claims priority to and the benefit of Korean Patent Application No. 10-2018-0091746, filed on Aug. 7, 2018, the entire contents of which are incorporated herein by reference.

FIELD

The present disclosure relates to a vehicle and method for controlling the same to obtain an accumulated distance traveled by the vehicle.

BACKGROUND

The statements in this section merely provide background information related to the present disclosure and may not constitute prior art.

An accumulated distance traveled by a vehicle is typically calculated by a cluster based on information measured by a sensor equipped in the vehicle. That is, the accumulated distance is obtained by unilaterally providing information from the sensor and processing the information by the cluster.

We have discovered that such a traditional way of calculating the accumulated distance based on the unilateral provision of information makes arbitrary manipulation possible not only in the mechanical cluster but also in the electronic cluster. Especially, in an electronic digital cluster, the accumulated distance (or odometer) may be manipulated with little time and effort by replacing or reprogramming a chip. This odometer manipulation leads to dampening public trust in vehicle condition and especially causes significant side effects in aftermarkets.

SUMMARY

The present disclosure provides a vehicle and method for controlling the same to prevent manipulation of odometer information by creating a network with at least one other vehicle and sharing odometer information of a cluster with the other vehicle in the network.

In accordance with an aspect of the present disclosure, a vehicle includes: a cluster configured to obtain odometer information updated as the vehicle runs; a communication device configured to form a network with at least one other vehicle; a controller configured to generate first cluster information including a vehicle identification number, a cluster identification number, and odometer information, send the first cluster information to the at least one other vehicle using the network, and to control the communication device to receive second cluster information of the at least one other vehicle; and a storage configured to store network information including the first cluster information of the vehicle and the second cluster information of the at least one other vehicle.

The network information may be shared between the vehicle and the at least one other vehicle included in the network.

The storage may store a cluster identification number of the cluster encrypted by a public key encryption method and allocated to the vehicle, and the controller may send the first cluster information to the at least one other vehicle when the cluster identification number of the cluster matches a previously stored cluster identification number in the storage.

The controller may periodically send the first cluster information updated as the vehicle runs to the at least one other vehicle in order to update the network information.

The controller may control the communication device to periodically receive the second cluster information of the at least one other vehicle updated as the at least one other vehicle runs from the at least one other vehicle.

The controller may update the network information based on the received second cluster information of the at least one other vehicle when a cluster identification number in the second received cluster information of the at least one other vehicle matches a cluster identification number of the at least one other vehicle in the stored network information.

The controller may update the network information based on the received second cluster information of the at least one other vehicle when odometer information in the received second cluster information of the at least one other vehicle has a higher value than odometer information of the at least one other vehicle in the stored network information.

The controller may update odometer information of the cluster based on network information received from the at least one other vehicle when the odometer information of the vehicle in the network information received from the at least one other vehicle does not match the odometer information of the cluster.

The vehicle may further include an input device configured to receive an input of a user, wherein the controller is configured to control the communication device and to send a request message including user identification information, private key information of the user, and a cluster identification number of a newly installed cluster received through the input device to a data center when the cluster is replaced.

When receiving an authorization message from the data center indicating that user identification information and private key information stored in the data center match the user identification information and the user's private key information included in the request message, the controller controls the communication device to receive the network information from the at least one other vehicle.

The controller may, when receiving the network information from the at least one other vehicle, update odometer information of the newly installed cluster based on the network information.

The controller may control the communication device to send cluster information including the cluster identification number of the newly installed cluster to the at least one other vehicle in order to update the network information.

In accordance with another aspect of the present disclosure, a method for controlling the vehicle includes: updating odometer information as the vehicle runs; forming a network between the vehicle and at least one other vehicle; generating first cluster information including a vehicle identification number, a cluster identification number, and odometer information of the vehicle; sending the first cluster information to the at least one other vehicle using the network; receiving second cluster information of the at least one other vehicle using the network; and storing network information including the first cluster information of the vehicle and the second cluster information of the at least one other vehicle.

The sending the first cluster information to the at least one other vehicle using the network may include storing a cluster identification number encrypted in a public key encryption method and allocated to the vehicle, and sending the first cluster information to the at least one other vehicle when the cluster identification number of the cluster matches a previously stored cluster identification number of the cluster.

The sending the first cluster information to the at least one other vehicle using the network may include periodically sending the first cluster information updated as the vehicle runs to the at least one other vehicle in order to update the network information.

The receiving the second cluster information of the at least one other vehicle from the at least one other vehicle using the network may include periodically receiving the second cluster information of the at least one other vehicle updated as the at least one other vehicle runs from the at least one other vehicle.

The method may further include updating the network information based on the received second cluster information of the at least one other vehicle when a cluster identification number in the received second cluster information of the at least one other vehicle matches a previously stored cluster identification number of the at least one other vehicle in the network information.

The method may further include updating the network information based on the received second cluster information of the at least one other vehicle when odometer information in the received second cluster information of the at least one other vehicle has a higher value than previously stored odometer information of the at least one other vehicle in the network information.

The method may further include updating odometer information of the cluster based on network information received from the at least one other vehicle when the odometer information of the vehicle in the network information received from the at least one other vehicle does not match the odometer information of the cluster.

The method may further include receiving an input of a user; sending a request message including user identification information, user's private key information, and a cluster identification number of a newly installed cluster received through the input device to a data center when the cluster is replaced; when receiving an authorization message from the data center indicating that user identification information, user's private key information, and a cluster identification number stored in the data center match the user identification information, the user's private key information, and the cluster identification number included in the request message, receiving the network information from the at least one other vehicle; and when receiving the network information from the at least one other vehicle, updating odometer information of the newly installed cluster based on the network information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 3A and 3B show network information shared in a network;

FIG. 5 shows a request message to be sent to a data center from a vehicle;

Figure 1:
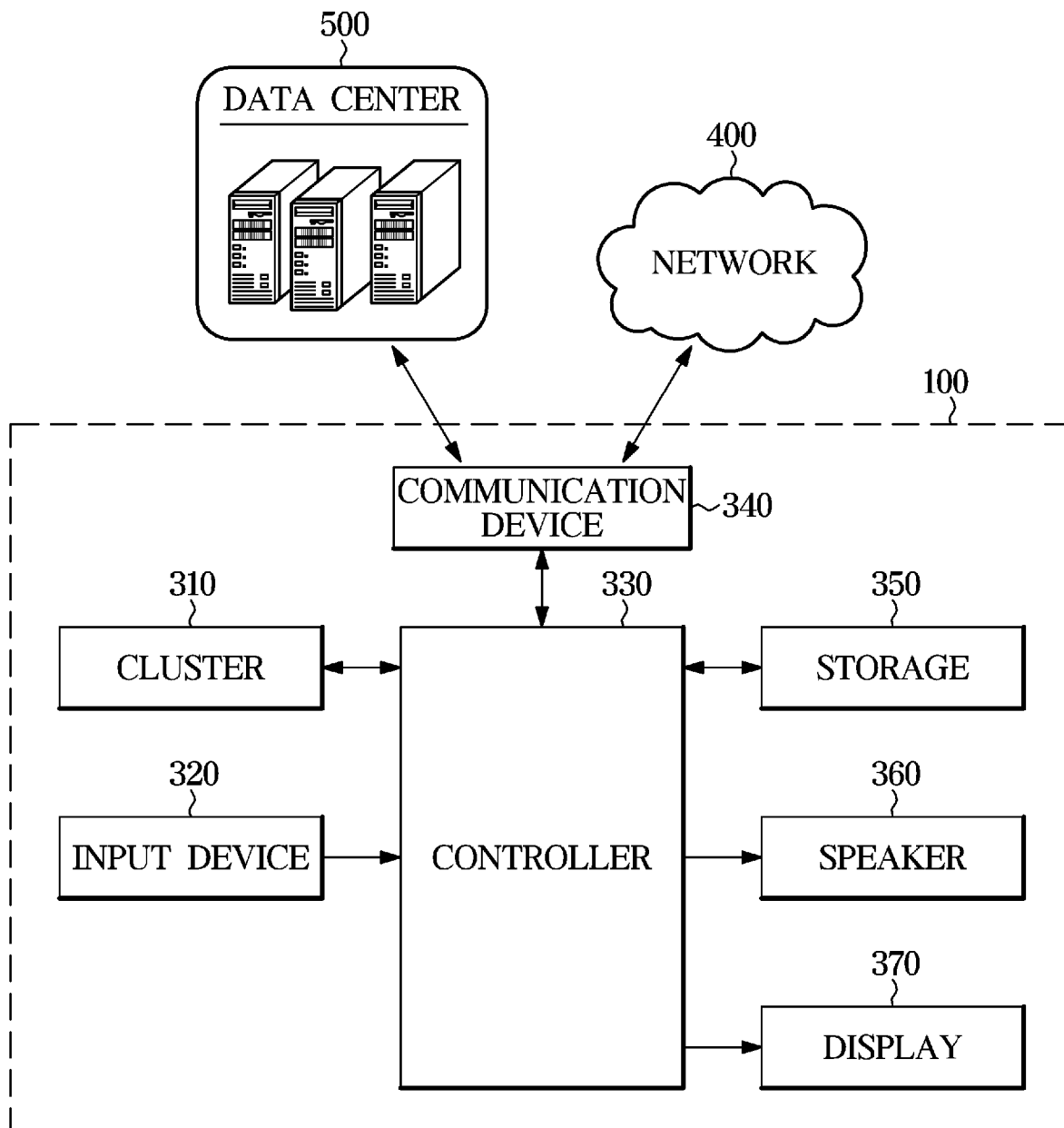
FIG. 1 is a control block diagram for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of forms of the present disclosure will be described, and description of what are commonly known in the art or what overlap each other in the forms will be omitted.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Furthermore, the terms, such as "~part", "~block", "~member", "~module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Reference numerals used for method steps are just used to identify the respective steps, but not to limit an order of the steps. Thus, unless the context clearly dictates otherwise, the written order may be practiced otherwise.

Forms of a vehicle and method for controlling the same will now be described in detail with reference to accompanying drawings.

FIG. 1 is a control block diagram of a vehicle 100, according to one form of the present disclosure. Operation of the vehicle 100 will now be described in detail with reference to the configuration of the vehicle 100 and the control block diagram of FIG. 1.

Referring to FIG. 1, the vehicle 100 includes a cluster 310 for obtaining odometer information updated as the vehicle 100 runs, an input device 320 for receiving an input of the user, a controller 330 for creating and updating network information of a network 400 created between the vehicle 100 and at least one other vehicle and updating the odometer information of the cluster 310 based on the network information when odometer information in the network information does not match the odometer information of the cluster 310, a communication device 340 for creating the network 400 to share odometer information with the at least one other vehicle and communicating with a data center 500 that authorizes replacement of the cluster 310, a storage 350 for storing network information, a vehicle identification number, a cluster identification number, etc., a speaker 360 for outputting a warning sound to notify the user that the odometer information of the cluster 310 has been manipulated, and a display 370 for displaying a message indicating for the user that the odometer information of the cluster 310 has been manipulated.

In one form, the cluster 310 of the vehicle 100 may provide the driver with various information relating to the vehicle 100, such as speed of the vehicle 100, the number of engine rotations, an amount of remaining fuel, temperature of engine oil, whether a turn signal is flickering, a distance traveled by the vehicle, or the like. The cluster 310 may be implemented with lights, indicators, or the like, and it may be implemented with a display panel as well, in some forms. In the case that the cluster 310 is implemented with the display panel, in addition to the aforementioned information, the cluster 310 may provide other various information such as gas mileage, whether various functions of the vehicle 100 are performed, or the like to the driver by displaying them.

In one form, the cluster 310 of the vehicle 100 may obtain odometer information updated as the vehicle 100 runs. Specifically, the cluster 310 may obtain a distance traveled by the vehicle 100 using a wheel speed sensor module that measures the distance traveled by the vehicle 100, and may obtain odometer information by calculating an accumulated distance traveled by the vehicle 100 based on the distance traveled by the vehicle 100. The cluster 310 may also obtain and store the odometer information by calculating the accumulated distance traveled by the vehicle 100 in real time or periodically.

Furthermore, the cluster 310 may send the odometer information to the controller 330. The odometer information sent to the controller 330 may be included in network information to be shared in the network 400, and shared with other vehicle(s) in the network 400.

Moreover, if the odometer information of the cluster 310 does not match the odometer information in the network information, it may be updated based on the network information. For example, if the odometer information of the cluster 310 does not match the odometer information in the network information because the user of the vehicle 100 manipulates the odometer information of the cluster 310 or the cluster 310 is replaced, the odometer information of the cluster 310 may be updated based on the network information to indicated an actual accumulated distance traveled by the vehicle 100.

The cluster 310 may include at least one memory for storing a program for carrying out the aforementioned and following operations and the odometer information obtained, and at least one processor for executing the program. In a case that the memory and the processor are each provided in the plural, they may be integrated in a single chip or physically distributed.

In one form, a center fascia (not shown) of the vehicle 100 may be equipped with the input device 320 for receiving various commands related to the vehicle 100. The input device 320 may be implemented with mechanical buttons, knobs, a touch pad, a touch screen, a stick-type manipulation device, a trackball, or the like. The user may control many different operations of the vehicle 100 by manipulating the input device 320. Alternatively, the input device 320 may be integrated with the display 370 and implemented using a touch screen.

The input device 320 of the vehicle 100 may receive an input of the user of the vehicle 100. Specifically, in a case that the cluster 310 is replaced, the input device 320 may receive user identification information of a user who replaces the cluster 310, the user's private key information, a cluster identification number of a newly installed cluster, and/or the like from the user.

The user who replaces the cluster 310 may be a person in charge of the service in a service center for the vehicle maker. The user identification information of the user is used to identify the user, and the user's private key is information about a private key to change the cluster identification number that is encrypted in a public key encryption method and allocated to the vehicle 100.

The user identification information and the user's private key information is stored and managed in a data center 500 for the vehicle maker. When the user identification information and the user's private key information entered through the input device 320 is sent to the data center 500 for the vehicle maker, the data center 500 may compare it with user identification information and private key information stored in the data center 500.

The controller 330 of the vehicle 100 may control the communication device 340 to create the network 400 with at least one other vehicle. The network 400 is created between the vehicle 100 and other vehicle(s) included in the network 400, allowing the vehicle 100 and other vehicle to share data through wireless communication. Specifically, the vehicle 100 and other vehicle in the network 400 become nodes of the network 400 that may be able to communicate with each other and share data.

The wireless communication corresponds to e.g., a cellular communication protocol, using at least one of 5th generation mobile telecommunication (5G), Long-Term Evolution (LTE), LTE-Advanced (LTE-A), Code Divisional Multiplexing Access (CDMA), Wideband CDMA WCDMA, Universal Mobile Telecommunications System (UMTS), Wireless Broadband (WiBro), and Global System for Mobile Communications (GSM). The wireless communication may also include short-range communication. The short-range communication may include at least one of e.g., wireless fidelity (Wi-Fi), Bluetooth, near field communication (NFC), etc.

In one form, the network 400 may be a peer to peer (P2P) network that may allow the vehicle 100 and other vehicle in the network 400 to directly communicate with each other without a server, but is not limited thereto.

Since the vehicle 100 and at least one other vehicle may be able to share data by creating the network 400 and communicating with each other, they may also share odometer information, thereby preventing manipulation of odometer information of each vehicle and improving preservation of the odometer information of each vehicle without need for an extra server.

Specifically, if the odometer information of a cluster installed in a vehicle in the network 400 does not match odometer information of the vehicle in the network information shared in the network 400 because the vehicle has replaced the cluster or has manipulated the odometer information of the cluster installed in the vehicle, the odometer information of the vehicle may be updated to the odometer information in the network information, thereby preventing manipulation of the odometer information of the vehicle. This will be described later in detail.

The controller 330 of the vehicle 100 may create network information to be shared in the network 400. For this, the controller 330 may create cluster information of the vehicle 100 including a vehicle identification number, a cluster identification number, and odometer information of the vehicle 100.

The vehicle identification number included in the cluster information corresponds to a number to identify the vehicle 100, which may be allocated to the vehicle 100 in the manufacturing stage of the vehicle 100. The vehicle identification number may be stored in the storage 350, which will be described later, and included in the cluster information under the control of the controller 330.

The cluster identification number included in the cluster information corresponds to a number to identify the cluster 310 installed in the vehicle 100, which may be allocated to the vehicle 100 in the manufacturing stage of the vehicle 100. The cluster identification number is encrypted in a public key encryption method and assigned to the vehicle 100 so that a private key of the vehicle maker may be used to change the cluster identification number if replacement of the cluster 310 is desired. The cluster identification number may be stored in the storage 350, which will be described later, and included in the cluster information under the control of the controller 330.

Further, the controller 330 may add odometer information received from the cluster 310 to the cluster information. The odometer information indicates an accumulated distance traveled by the vehicle 100.

In another form, the controller 330 may create the cluster information and determine whether the cluster identification number included in the cluster information matches the cluster identification number of the cluster 310 that sends the odometer information.

If the cluster identification number included in the cluster information matches the cluster identification number of the cluster 310 that sends the odometer information, the controller 330 may send the cluster information of the vehicle 100 to other vehicle in the network 400.

Furthermore, the controller 330 may receive cluster information of other vehicle from the other vehicle in the network 400. The other vehicle in the network 400 may send its cluster information to other vehicles in the network 400 including the vehicle 100. In other words, each of the vehicles in the network 400 may send its cluster information created by its controller to the other vehicles in the network 400. Accordingly, each vehicle included in the network 400 may obtain cluster information of any vehicle included in the network 400.

The controller 330 of the vehicle 100 may create network information including the cluster information of the vehicle 100 and cluster information of the other vehicles in the network 400. Specifically, the controller 330 may create the network information to include cluster information of the vehicle 100 and each of the other vehicles included in the network 400. The controller 330 may control the storage 350 to store the network information.

Since the network information includes the cluster information of the vehicle 100 and the other vehicles, it may include a vehicle identification number, a cluster identification number, and odometer information of each of the vehicle 100 and the other vehicles.

The network information may be created by each of the vehicle 100 and the other vehicles in the network 400 and shared among the vehicles in the network 400 using wireless communication. Specifically, each of the vehicle 100 and other vehicles in the network 400 may obtain and store the network information including the cluster information of all the vehicles in the network 400.

The controller 330 may control the communication device 340 to receive cluster information from other vehicle in the network 400, and update the network information based on the cluster information of the other vehicle.

Specifically, the controller 330 may determine whether the cluster identification number in the cluster information of the other vehicle in the network 400 matches the cluster identification information in the network information stored in the storage 350. The cluster identification information in the network information to be compared with the cluster identification number in the cluster information of the other vehicle corresponds to the other vehicle that sends the cluster information.

If the cluster identification number in the cluster information of the other vehicle matches the cluster identification information in the network information, the controller 330 may determine whether odometer information in the cluster information of the other vehicle has a higher value than the odometer information in the network information stored in the storage 350. Specifically, the controller 330 may determine whether the odometer information sent from the other vehicle in the network 400 has a higher value than an accumulated distance indicated by the odometer information in the network information stored in the storage 350.

If the odometer information in the cluster information sent from the other vehicle has a higher value than the odometer information in the network information stored in the storage 350, the controller 330 may update the network information based on the cluster information received from the other vehicle.

In a case of replacing the cluster 310 installed in the vehicle 100, the controller 330 of the vehicle 100 may update the odometer information of a newly installed cluster based on the network information.

Specifically, the controller 330 may receive an input of the user through the input device 320. The controller 330 may receive an input of the user about user identification information of a user who replaces the cluster 310, the user's private key information, and a cluster identification number of a newly installed cluster through the input device 320. The user who replaces the cluster 310 may be a person in charge of the service in a service center for the vehicle maker.

The controller 330 may send a request message requesting authorization of replacement of the cluster 310 to the data center 500. The request message may include the user identification information, the user's private key information, and the cluster identification number of the newly installed cluster entered by the user.

When the user identification information and the user's private key information is sent to the data center 500 for the vehicle maker, the data center 500 may compare it with user identification information and private key information stored in the data center 500. If the information sent to the data center 500 matches the information stored in the data center 500, the data center 500 may send an authorization message giving an authorization to replace the cluster 310 to the vehicle 100.

Furthermore, if the information sent to the data center 500 matches the information stored in the data center 500, the data center 500 may replace the cluster identification number allocated to the vehicle 100 with the cluster identification number included in the request message. Accordingly, the authorization message may include the cluster identification number of the newly installed cluster to be allocated to the vehicle 100.

When receiving the authorization message from the data center 500, the controller 330 may control the storage 350 to store the cluster identification number of the newly installed cluster included in the authorization message.

When receiving the authorization message from the data center 500, the controller 330 may receive network information from the network 400. Specifically, the controller 330 of the vehicle 100 may control the communication device 340 to receive the network information of the network 400 from other vehicle included in the network 400.

The controller 330 may update the odometer information of the newly installed cluster based on the received network information. The newly installed cluster may generally have '0 kilometer (km)' as the odometer information, and may not reflect an actual accumulated distance traveled by the vehicle 100.

Accordingly, the controller 330 may receive the network information having actual odometer information of the vehicle 100 from other vehicle in the network 400 and update odometer information of the newly installed cluster based on the received network information, thereby having an actual accumulated distance reflected on the newly installed cluster.

The controller 330 may control the communication device 340 to send the cluster information including a cluster identification number of the newly installed cluster to the network 400 to update the network information of the network 400.

Specifically, the controller 330 may create cluster information to include the cluster identification number of the newly installed cluster allocated to the vehicle 100 through the authorization message and send the created cluster information to other vehicle included in the network 400, so that the network information may be updated based on the cluster information of the vehicle 100.

The controller 330 may include at least one memory for storing a program for carrying out the aforementioned and following operations, and at least one processor for executing the program. In a case that the memory and the processor are each provided in the plural, they may be integrated in a single chip or physically distributed.

The communication device 340 may create the network 400 with at least one other vehicle under the control of the controller 330. The network 400 is created between the vehicle 100 and other vehicle(s) included in the network 400, allowing the vehicle 100 and other vehicle to share data through wireless communication.

Specifically, the vehicle 100 and other vehicle in the network 400 become nodes of the network 400 that may be able to communicate with each other and share data. The communication device 340 may send the cluster information and the network information of the vehicle 100 to other vehicle in the network 400, and receive cluster information and network information of other vehicle in the network 400 from the other vehicle.

Furthermore, the communication device 340 may communicate with the data center 500 under the control of the controller 330. Specifically, the communication device 340 may send a request message requesting authorization of replacement of the cluster 310 to the data center 500 in the case of replacing the cluster 310, and receive an authorization message giving an authorization to replace the cluster 310 or a non-authorization message disapproving the replacement of the cluster 310 from the data center 500.

The communication device 340 may create the network 400 with other vehicle not only in WiFi or Wibro scheme, but also other various wireless communication schemes, such as GSM, CDMA, WCDMA, UMTS, TDMA, LTE, 5G, etc., allow data transmission or reception between the vehicle 100 and the other vehicle in the network 400, and perform communication with the data center 500 for data transmission or reception.

The storage 350 of the vehicle 100 may store various information about the vehicle 100, such as the network information, the vehicle identification number, the cluster identification number, etc. The storage 350 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto, to store the various information.

The speaker 360 of the vehicle 100 may output a warning sound notifying the user of the vehicle 100 that the odometer information of the cluster 310 was manipulated. For example, if the odometer information of the cluster 310 does not match the odometer information in the network information, the speaker 360 may output the warning sound notifying the user that the odometer information of the cluster 310 was manipulated.

The display 370 of the vehicle 100 may provide images of various information to the user of the vehicle 100. For example, the display 370 may visually present various information, such as maps, weather, news, various moving or still images, information regarding condition or operation of the vehicle 100, e.g., information about the air conditioner, etc.

The display 370 of the vehicle 100 may display a message notifying the user of the vehicle 100 that the odometer information of the cluster 310 was manipulated. For example, if the odometer information of the cluster 310 does not match the odometer information in the network information, the display 370 may display a message notifying the user that the odometer information of the cluster 310 was manipulated.

The display 370 may be implemented with a commonly-used navigation system. The display 370 may be installed inside a housing integrally formed with the dashboard (not shown) such that the display panel is exposed to the outside. Alternatively, the display 370 may be installed in the middle or the lower part of the center fascia (not shown), or may be installed on the inside of the windshield (not shown) or on the top of the dashboard by means of a separate supporter (not shown). Besides, the display 370 may be installed at any position that may be considered by the designer.

Figure 2:
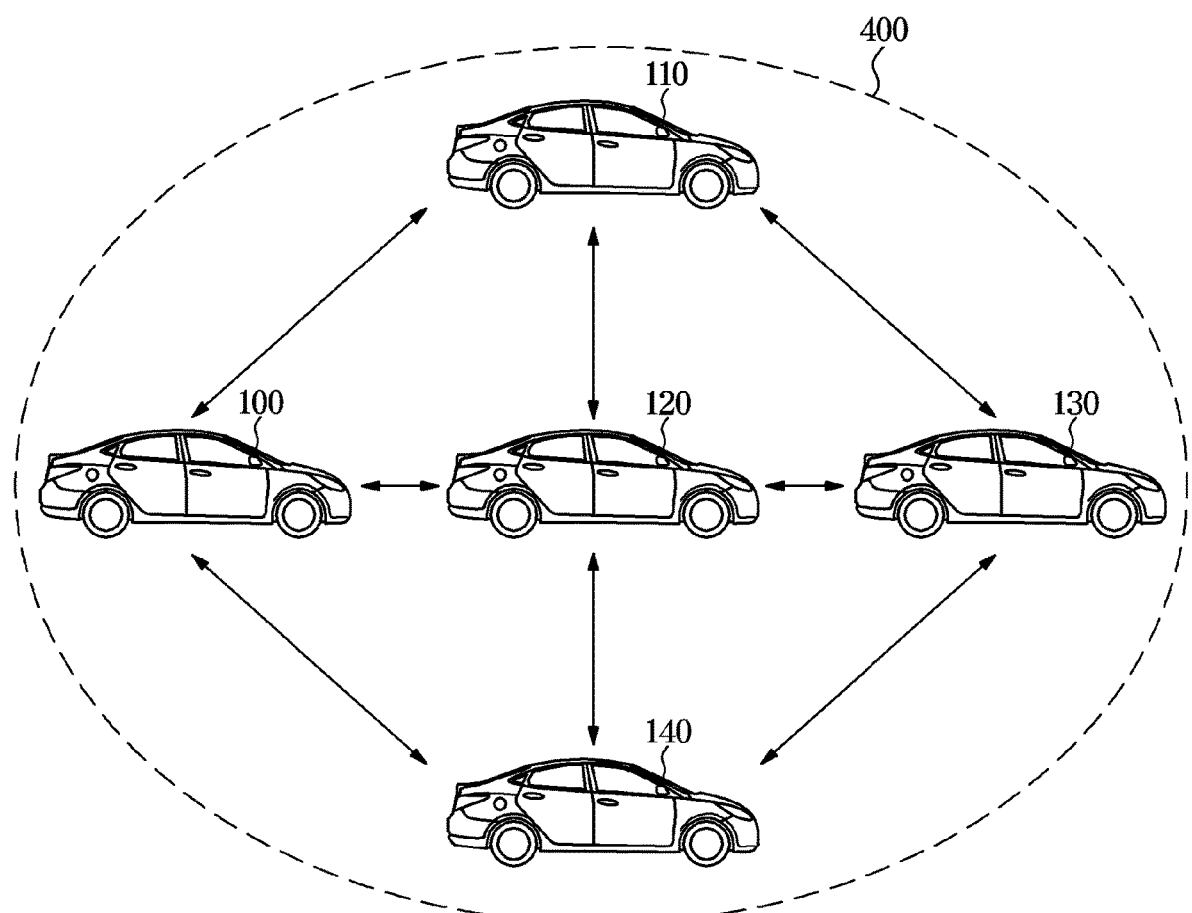
FIG. 2 shows a network including a vehicle and other vehicles.

FIG. 2 shows the network 400 including the vehicle 100 and at least one other vehicle, in one form of the present disclosure, and FIGS. 3A and 3B show network information 450 shared in the network 400, in one form of the present disclosure.

The vehicle 100 may create the network 400 with the at least one other vehicle. Specifically, the controller 330 of the vehicle 100 may control the communication device 100 to create the network 400 with the at least one other vehicle.

The network 400 is created between the vehicle 100 and other vehicle(s) included in the network 400, allowing the vehicle 100 and other vehicle to share data through wireless communication. The vehicles included in the network 400 become nodes of the network 400 that may be able to communicate with one another and share data.

Referring to FIG. 2, the vehicle 100 creates a network with other vehicles 110 to 140. Although the vehicle 100 and four other vehicles 110 to 140 create the network 400 in FIG. 2, there are no limitations on the number of vehicles included in the network 400 and any vehicle located in a range allowing wireless communication may be included in the network 400. In the following description, an occasion when the vehicle 100 and the other vehicles 110 to 140 are included in the network 400 will be focused.

The controller 330 of the vehicle 100 may create cluster information of the vehicle 100. Specifically, the controller 330 may create cluster information of the vehicle 100 to include a vehicle identification number and a cluster identification number stored in the storage 350, and odometer information of the vehicle 100 received from the cluster 310. That is, the cluster information includes a vehicle identification number, a cluster identification number, and odometer information of the vehicle 100. In this way, any of the other vehicles 110 to 140 in the network 400 may create its cluster information.

The controller 330 of the vehicle 100 may determine whether the cluster identification number in the cluster information of the vehicle 100 matches the cluster identification number of the cluster 310. Specifically, the controller 330 may determine whether the cluster identification number of the vehicle 100 allocated to the vehicle 100 and included in the cluster information matches the cluster identification number of the cluster 310 that sends the odometer information.

The cluster identification number included in the cluster information corresponds to a number to identify the cluster 310 installed in the vehicle 100, which may be allocated to the vehicle 100 in the manufacturing stage of the vehicle 100. The cluster identification number is encrypted in a public key encryption method and assigned to the vehicle 100 so that a private key of the vehicle maker may be used to change the cluster identification number if replacement of the cluster 310 is desired.

The controller 330 may determine whether the cluster 310 has been replaced by comparing the cluster identification number in the cluster information with the cluster identification number of the cluster 310 that sends the odometer information.

The controller 330 may determine whether the odometer information received from the cluster 310 originates from the cluster not yet replaced in the vehicle 100, and based on the determination, determine whether the odometer information is valid.

If the cluster identification number in the cluster information matches the cluster identification number of the cluster 310, the controller 330 of the vehicle 100 may control the communication device 340 to send the cluster information of the vehicle 100 to the other vehicles 110 to 140 in the network 400. Accordingly, the cluster information of the vehicle 100 may be shared with other vehicles 110 to 140 in the network 400.

The controller 330 of the vehicle 100 may control the communication device 340 to receive cluster information of each of the other vehicles 110 to 140 from the vehicle 110 to 140 in the network 400. In the same way as the vehicle 100 does, each of the other vehicles 110 to 140 in the network 400 may determine whether a cluster identification number in its cluster information matches a cluster identification number of its cluster and if they are matched, send its cluster information to other vehicles in the network 400.

In other words, each vehicle in the network 400 may send its cluster information to other vehicles and receive cluster information of any of the other vehicles, thereby obtaining cluster information of all the vehicles included in the network 400. Accordingly, each vehicle included in the network 400 may obtain cluster information of all the vehicles in the network 400.

The controller 330 may create network information to include the cluster information of the vehicle 100 and cluster information of the other vehicles 110 to 140, and control the storage 350 to store the network information. Each of the vehicles 100 to 140 included in the network 400 may create network information to include cluster information of all the vehicles 100 to 140 by obtaining each cluster information of each of the vehicles 100 to 140.

Referring to FIG. 3A, the network information 450 may include cluster information corresponding to each of the vehicles 100 to 140 in the network 400. Specifically, the network information 450 may include a vehicle identification number, a cluster identification number, odometer information with an update date, which correspond to each of the vehicles 100 to 140 in the network 400.

The network information 450 may be shared among the vehicles 100 to 140 included in the network 400 over the network 400, and accordingly, manipulation of odometer information of each of the vehicles 100 to 140 may be prevented and preservation of the odometer information of each of the vehicles 100 to 140 may be improved without need for an extra server.

The odometer information of the vehicle 100 may be updated as the vehicle 100 runs. Accordingly, the controller 330 of the vehicle 100 may periodically send the cluster information to other vehicles 110 to 140 in the network 400 to update the network information. In this way, each of the other vehicles 110 to 140 in the network 400 may also periodically send its cluster information including the odometer information updated as the vehicle runs to other vehicles in the network 400.

The controller 330 of the vehicle 100 may control the communication device 340 to receive the cluster information periodically sent from the other vehicles 110 to 140 in the network 400.

When receiving the cluster information of at least one other vehicle in the network 400, the controller 330 of the vehicle 100 may update the network information 450 based on the received cluster information. In this regard, the controller 330 of the vehicle 100 may determine whether the cluster information received from the at least one other vehicle in the network 400 was manipulated, and update the network information 450 if it is determined that the cluster information was not manipulated.

Specifically, when receiving the cluster information of at least one other vehicle in the network 400, the controller 330 of the vehicle 100 may determine whether the cluster identification number in the received cluster information matches the cluster identification number in the network information 450 stored in the storage 350. The cluster identification number in the network information 450 to be compared with the cluster identification number of the at least one other vehicle corresponds to the vehicle that sends the cluster information.

If the cluster identification number in the received cluster information matches the cluster identification information in the network information 450, the controller 330 may determine whether odometer information in the received cluster information has a higher value than the odometer information in the network information 450 stored in the storage 350. The odometer information in the network information 450 to be compared with the odometer information of the at least one other vehicle corresponds to the vehicle that sends the cluster information.

Specifically, the controller 330 may determine whether the odometer information sent from the at least one other vehicle in the network 400 has a higher value than an accumulated distance indicated by the odometer information in the network information 450 stored in the storage 350.

If the odometer information in the received cluster information has a higher value than the odometer information in the network information 450 stored in the storage 350, the controller 330 may update the network information 450 based on the cluster information received from the other vehicle.

Referring to FIG. 3B, when receiving cluster information of other vehicle 110 through the communication device 340, the controller 330 of the vehicle 100 may update the network information 450 based on the cluster information of the other vehicle 110. For example, the controller 330 may update odometer information 510 of the other vehicle 110 from 1231 km to 1250 km in the network information 450 based on the cluster information of the other vehicle 110, and accordingly an update date 520 in the network information 450 may also be updated.

If the user of the vehicle 100 manipulates the odometer information of the cluster 310 or replaces the cluster 310, the odometer information of the cluster 310 may not match the odometer information in the network information 450.

If the odometer information of the cluster 310 does not match the odometer information in the network information 450, the controller 330 may update the odometer information of the cluster 310 based on the network information 450.

Specifically, if the odometer information of the cluster 310 does not match the odometer information in the network information 450 shared among the vehicles in the network 400, the controller 330 may update the odometer information of the cluster 310 based on the network information 450. In this case, the odometer information in the network information 450 used to update the odometer information of the cluster 310 corresponds to the odometer information of the vehicle 100.

In other words, if the odometer information of a cluster included in each of the vehicles in the network 400 does not match the odometer information in the network information 450, the controller 330 may update the odometer information of the cluster based on the odometer information in the network information 450. One form of updating odometer information of a newly installed cluster replacing the cluster 310 of the vehicle 100 will now be described.

Figure 4:
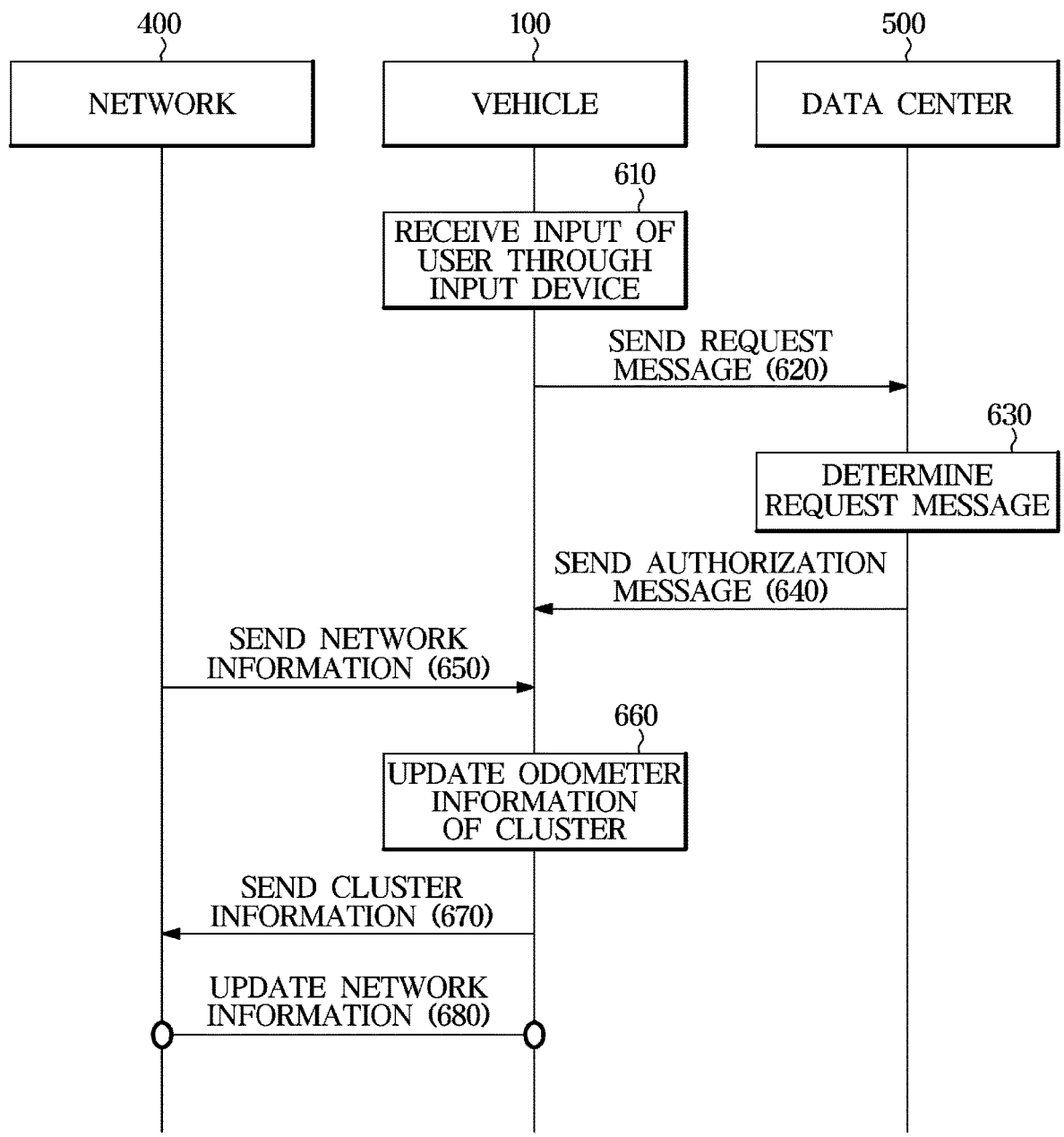
FIG. 4 is a flowchart illustrating a method for controlling a vehicle in an occasion when a cluster is replaced.
Figure 6:
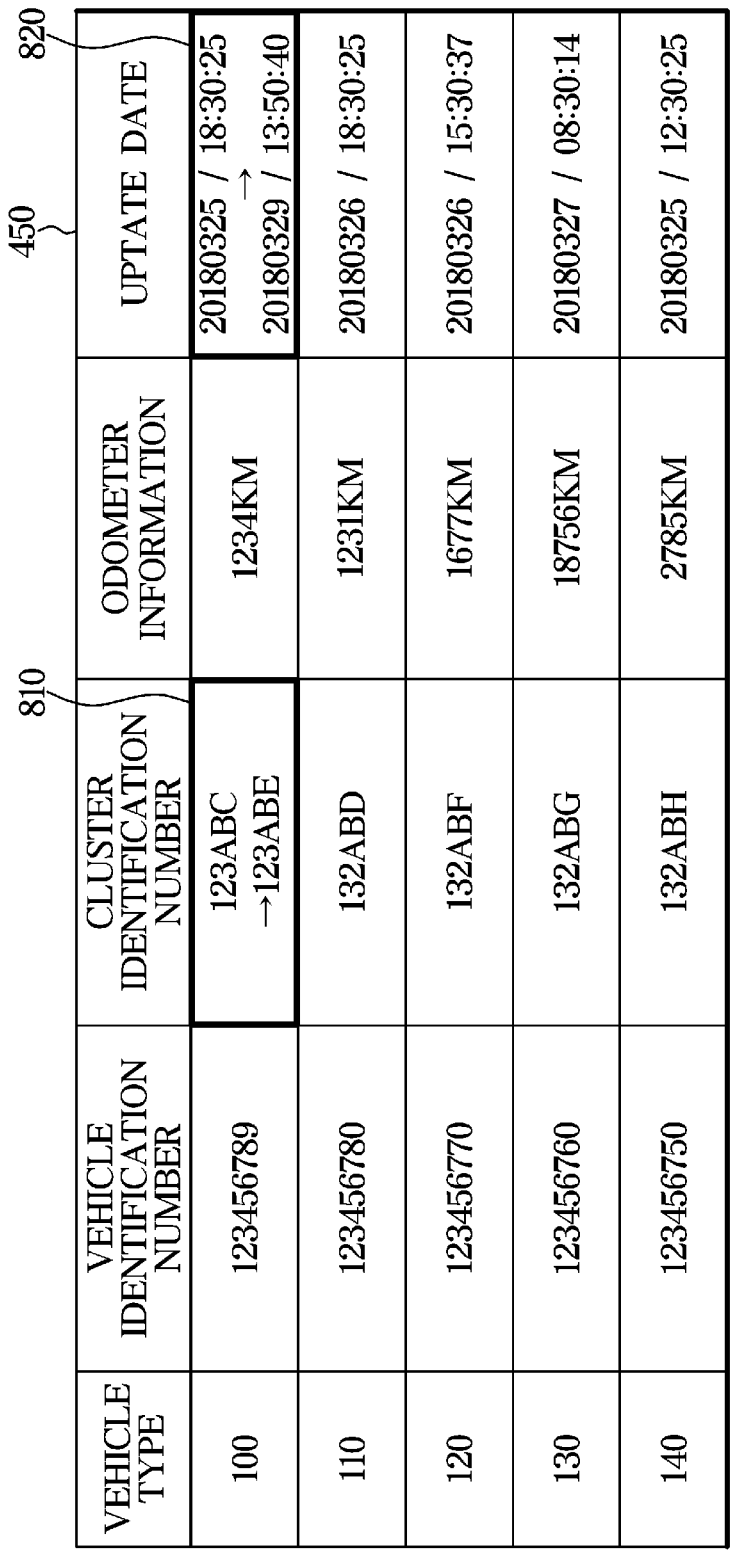
FIG. 6 shows network information updated in an occasion when a cluster is replaced.

FIG. 4 is a flowchart illustrating a method for controlling the vehicle 100 in an occasion when the cluster 310 is replaced, according to an exemplary form of the present disclosure, FIG. 5 shows a request message to be sent to a data center from the vehicle 100, in one form of the vehicle, and FIG. 6 shows the network information 450 updated in an occasion when the cluster 310 is replaced, according to another exemplary form of the present disclosure.

Referring to FIG. 4, the controller 330 of the vehicle 100 may receive an input of the user through the input device 310, in 610. The controller 330 may receive an input of the user about user identification information of a user who replaces the cluster 310, the user's private key information, and a cluster identification number of a newly installed cluster through the input device 320.

The user who replaces the cluster 310 may be a person in charge of the service in a service center for the vehicle maker. The user identification information of the user is used to identify the user, and the user's private key information is information about a private key to change the cluster identification number, which is encrypted in a public key encryption method and allocated to the vehicle 100.

The user identification information and the user's private key information is stored and managed in the data center 500 for the vehicle maker. When the user identification information and the user's private key information entered through the input device 320 is sent to the data center 500 for the vehicle maker, the data center 500 may compare it with user identification information and private key information stored in the data center 500.

The controller 330 of the vehicle 100 may send a request message requesting authorization to replace the cluster 310 to the data center 500, in 620. Referring to FIG. 5, a request message 700 may include user identification information 710 entered by the user, user's private key information 720, and a cluster identification number of a newly installed cluster.

In one form, the configuration of receiving an input of the user and sending the input of the user to the data center 500 may be implemented by telematics of the vehicle 100 or a communication terminal provided separately from the vehicle 100, which is able to send or receive data to or from the data center 500.

The data center 500 may determine the request message 700 received from the vehicle 100. The data center 500 may correspond to a server of the vehicle maker, which stores and manages user identification information of a user authorized to replace clusters and private key information to change the cluster identification number encrypted in a public key encryption method.

The data center 500 may determine the request message 700 by comparing the user identification information 710 and the user's private key information 720 with user identification information and private key information stored in the data center 500. If the comparison is matched, the data center 500 may determine that the user who sent the request message 700 is authorized to replace clusters and that the user's private key information 720 corresponds to private key information to be able to change the cluster identification number.

If the user identification number 710 and the user's private key information in the request message 700 match the user identification and the private key information stored in the data center 500, the data center 500 may send an authorization message indicating authorization to replace the cluster 310 to the vehicle 100, in 640. Furthermore, if the comparison is matched, the data center 500 may replace the cluster identification number allocated to the vehicle 100 with the cluster identification number 730 of the newly installed cluster included in the request message 700. Accordingly, the authorization message may include the cluster identification number of the newly installed cluster to be allocated to the vehicle 100. When receiving the authorization message from the data center 500, the controller 330 of the vehicle 100 may control the storage 350 to store the cluster identification number of the newly installed cluster included in the authorization message.

When receiving the authorization message from the data center 500, the controller 330 of the vehicle 100 may receive network information 450 from the network 400, in 650. Specifically, the controller 330 of the vehicle 100 may control the communication device 340 to receive the network information 450 of the network 400 from at least one other vehicle included in the network 400. The controller 330 of the vehicle 100 may receive the network information 450 before sending or receiving a message to or from the data center 500.

The controller 330 of the vehicle 100 may update the odometer information of the newly installed cluster based on the received network information 450, in 660. The newly installed cluster may generally have '0 km' as the odometer information, and may not reflect an actual accumulated distance traveled by the vehicle 100.

Accordingly, the controller 330 may receive the network information 450 having actual odometer information of the vehicle 100 from at least one other vehicle in the network 400 and update the odometer information of the newly installed cluster based on the received network information 450, thereby having an actual accumulated distance reflected on the newly installed cluster.

The vehicle 100 may send or receive cluster information over the network 400, in 670. The controller 330 of the vehicle 100 may control the communication device 340 to send the cluster information including a cluster identification number of the newly installed cluster over the network 400.

Specifically, the controller 330 may create cluster information to include the cluster identification number of the newly installed cluster allocated to the vehicle 100 through the authorization message and send the created cluster information to other vehicle included in the network 400, so that the network information 450 may be updated based on the cluster information of the vehicle 100.

The network information 450 of the network 400 may be updated by the vehicles included in the network 400, in 680. The vehicles included in the network 400 may update the cluster identification number of the vehicle 100 based on the cluster information of the vehicle 100. Referring to FIG. 6, a cluster identification number 810 of the vehicle 100 in the network information 450 may be updated based on the cluster information of the vehicle 100, and an update date 820 may also be updated.

Accordingly, even when the cluster 310 of the vehicle 100 is replaced, the vehicle 100 may have a newly installed cluster indicate an actual accumulated distance traveled by the vehicle 100 by reflecting actual odometer information of the vehicle 100 and continuously share odometer information of the newly installed cluster in the network 400.

A method for controlling the vehicle 100 in one form will now be described. The vehicle 100 may be applied in describing the method for controlling the vehicle 100. What are described above with reference to FIGS. 1 to 6 may also be applied in the method for controlling the vehicle without being specifically mentioned.

Figure 7:
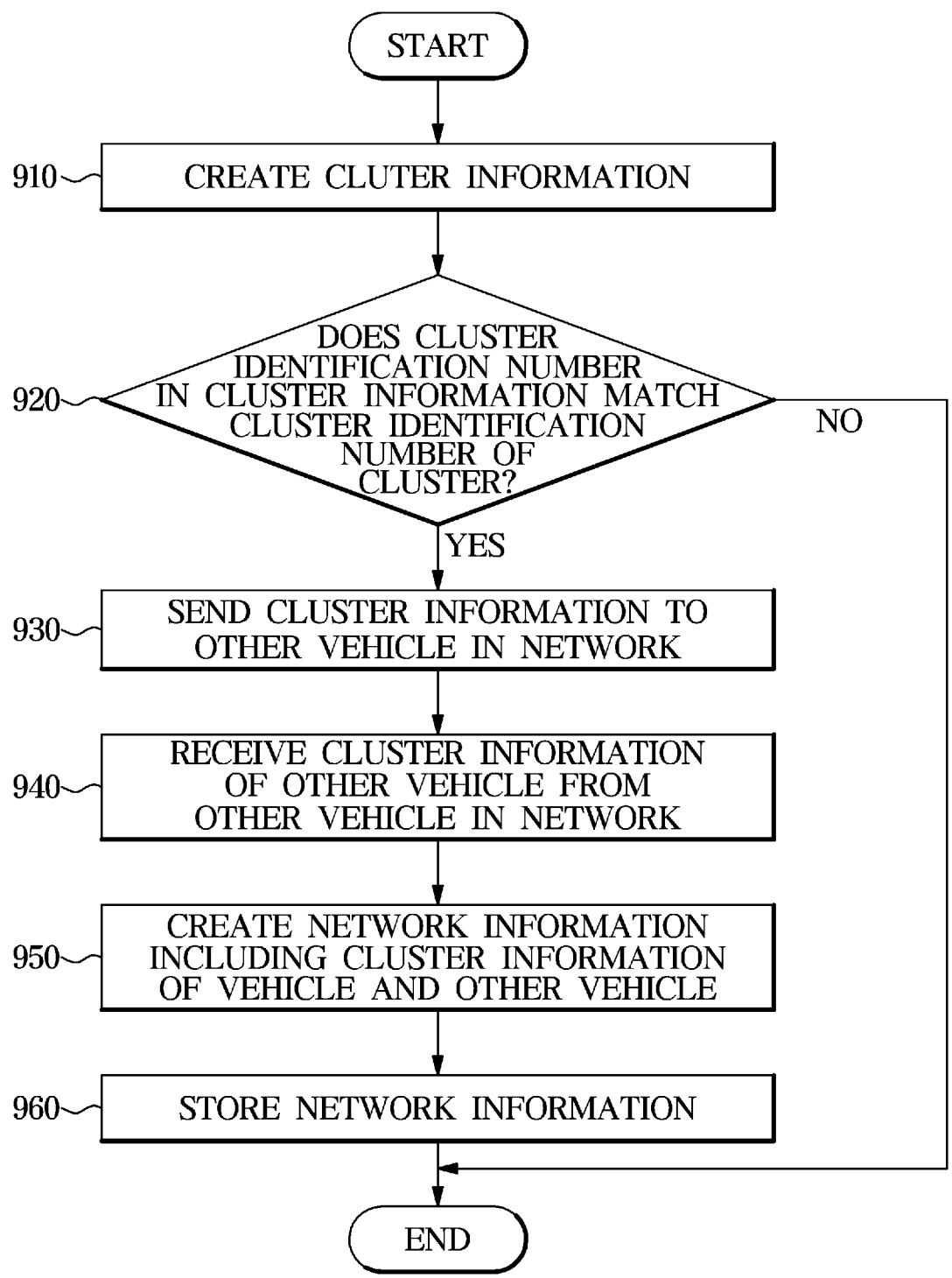
FIG. 7 is a flowchart illustrating an occasion when network information is created in a method for controlling a vehicle.

FIG. 7 is a flowchart illustrating an occasion when network information is created in a method for controlling a vehicle, in another form of the present disclosure.

Referring to FIG. 7, the controller 330 of the vehicle 100 may create cluster information of the vehicle 100 in 910. Specifically, the controller 330 may create cluster information of the vehicle 100 to include a vehicle identification number and a cluster identification number stored in the storage 350, and odometer information of the vehicle 100 received from the cluster 310.

That is, the cluster information includes a vehicle identification number, a cluster identification number, and odometer information of the vehicle 100. In this way, any of the other vehicles in the network 400 may create its cluster information.

The controller 330 of the vehicle 100 may determine whether the cluster identification number in the cluster information of the vehicle 100 matches the cluster identification number of the cluster 310, in 920. Specifically, the controller 330 may determine whether the cluster identification number of the vehicle 100 allocated to the vehicle 100 and included in the cluster information matches the cluster identification number of the cluster 310 that sends the odometer information.

The cluster identification number included in the cluster information corresponds to a number to identify the cluster 310 installed in the vehicle 100, which may be allocated to the vehicle 100 in the manufacturing stage of the vehicle 100. The cluster identification number is encrypted in a public key encryption method and assigned to the vehicle 100 so that a private key of the vehicle maker may be used to change the cluster identification number if replacement of the cluster 310 is desired.

The controller 330 may determine whether the cluster 310 has been illegally replaced by comparing the cluster identification number in the cluster information with the cluster identification number of the cluster 310 that sends the odometer information.

The controller 330 may determine whether the odometer information received from the cluster 310 originates from the cluster not yet replaced in the vehicle 100, and based on the determination, determine whether the odometer information is valid.

If the cluster identification number in the cluster information matches the cluster identification number of the cluster 310 (yes in 920), the controller of the vehicle 100 may control the communication device 340 to send the cluster information of the vehicle 100 to the other vehicle in the network 400, in 930. Accordingly, the cluster information of the vehicle 100 may be shared with other vehicles in the network 400.

The controller 330 of the vehicle 100 may control the communication device 340 to receive cluster information of other vehicle from the other vehicle in the network 400, in 940. In the same way as the vehicle 100 does, each of the other vehicles in the network 400 may determine whether a cluster identification number in its cluster information matches a cluster identification number of its cluster and if they are matched, send its cluster information to other vehicles in the network 400.

In other words, each vehicle in the network 400 may send its cluster information to other vehicles and receive cluster information of any of the other vehicles, thereby obtaining cluster information of all the vehicles included in the network 400. Accordingly, each vehicle included in the network 400 may obtain cluster information of all the vehicles in the network 400.

The controller 330 may create network information including the cluster information of the vehicle 100 and cluster information of the other vehicles, in 950. The controller 330 may store the network information, in 960. Specifically, the controller 330 may control the storage 350 to store the network information. Each vehicle included in the network 400 may create network information including cluster information of all the vehicles included in the network 400 by obtaining the cluster information of each of the vehicles.

The network information may be shared among the vehicles included in the network 400 over the network 400, and accordingly, manipulation of odometer information of each of the vehicles may be prevented and preservation of the odometer information of each of the vehicles may be enhanced without need for an extra server.

Figure 8:
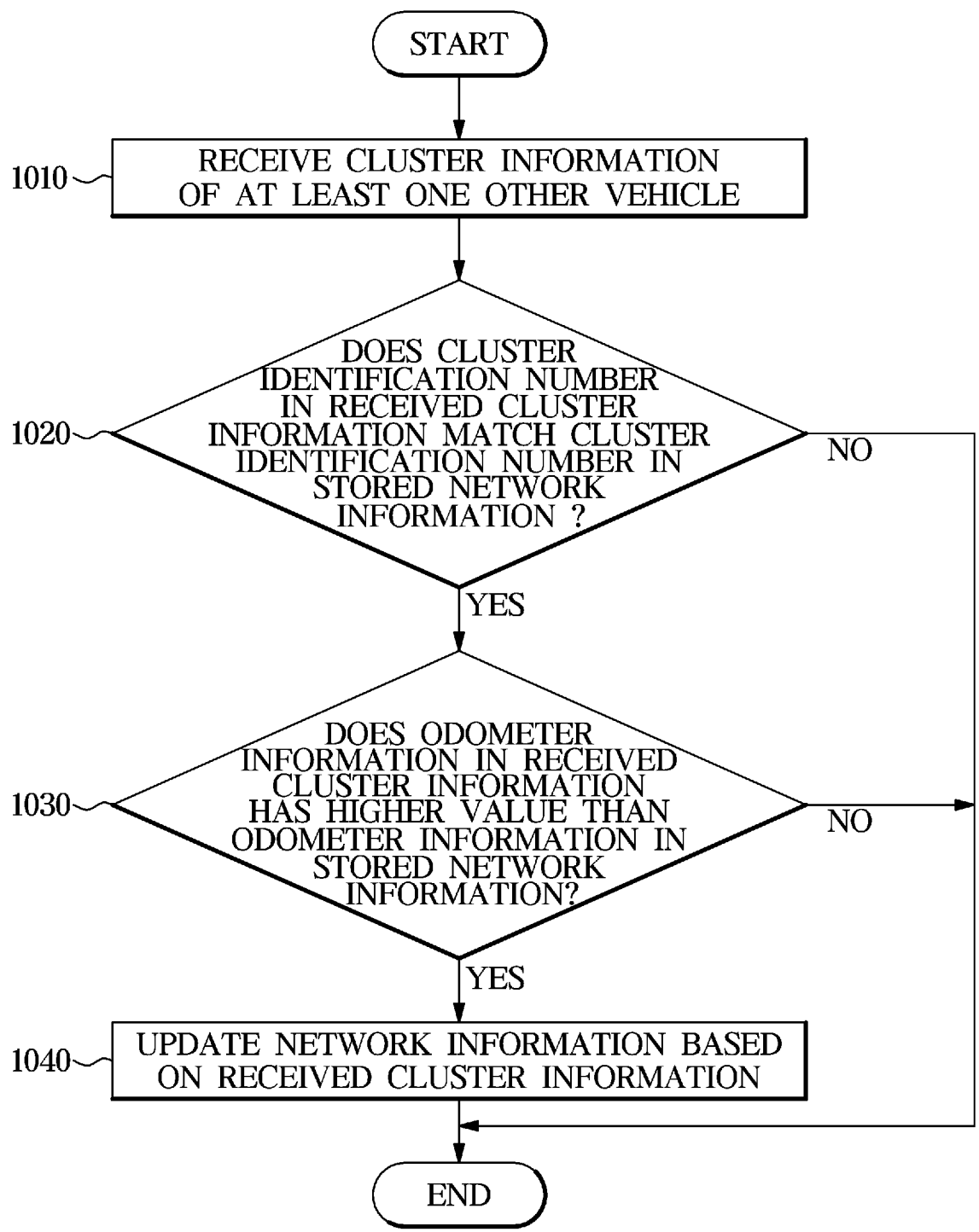
FIG. 8 is a flowchart illustrating an occasion when network information is updated in a method for controlling a vehicle.

FIG. 8 is a flowchart illustrating an occasion when network information is updated in a method for controlling a vehicle, according to another exemplary form of the present disclosure.

Referring to FIG. 8, the controller 330 of the vehicle 100 may receive cluster information of at least one other vehicle in the network 400, in 1010. The controller 330 of the vehicle 100 may determine whether the cluster information received from the at least one other vehicle in the network 400 was manipulated, and update the network information if it is determined that the cluster information was not manipulated.

Specifically, when receiving the cluster information of at least one other vehicle in the network 400, the controller 330 of the vehicle 100 may determine whether the cluster identification number in the received cluster information matches the cluster identification number in the network information stored in the storage 350, in 1020. The cluster identification number in the network information to be compared with the cluster identification number of the at least one other vehicle corresponds to the vehicle that sent the cluster information.

If the cluster identification number in the received cluster information matches the cluster identification information in the network information (yes in 1020), the controller 330 may determine whether odometer information in the received cluster information has a higher value than the odometer information in the network information stored in the storage 350, in 1030. The odometer information in the network information to be compared with the odometer information of the at least one other vehicle corresponds to the vehicle that sent the cluster information.

Specifically, the controller 330 may determine whether the odometer information sent from the at least one other vehicle in the network 400 has a higher value than an accumulated distance indicated by the odometer information in the network information stored in the storage 350.

If the odometer information in the received cluster information has a higher value than the odometer information in the network information stored in the storage 350 (yes in 1030), the controller 330 may update the network information based on the cluster information received from the other vehicle, in 1040.

Figure 9:
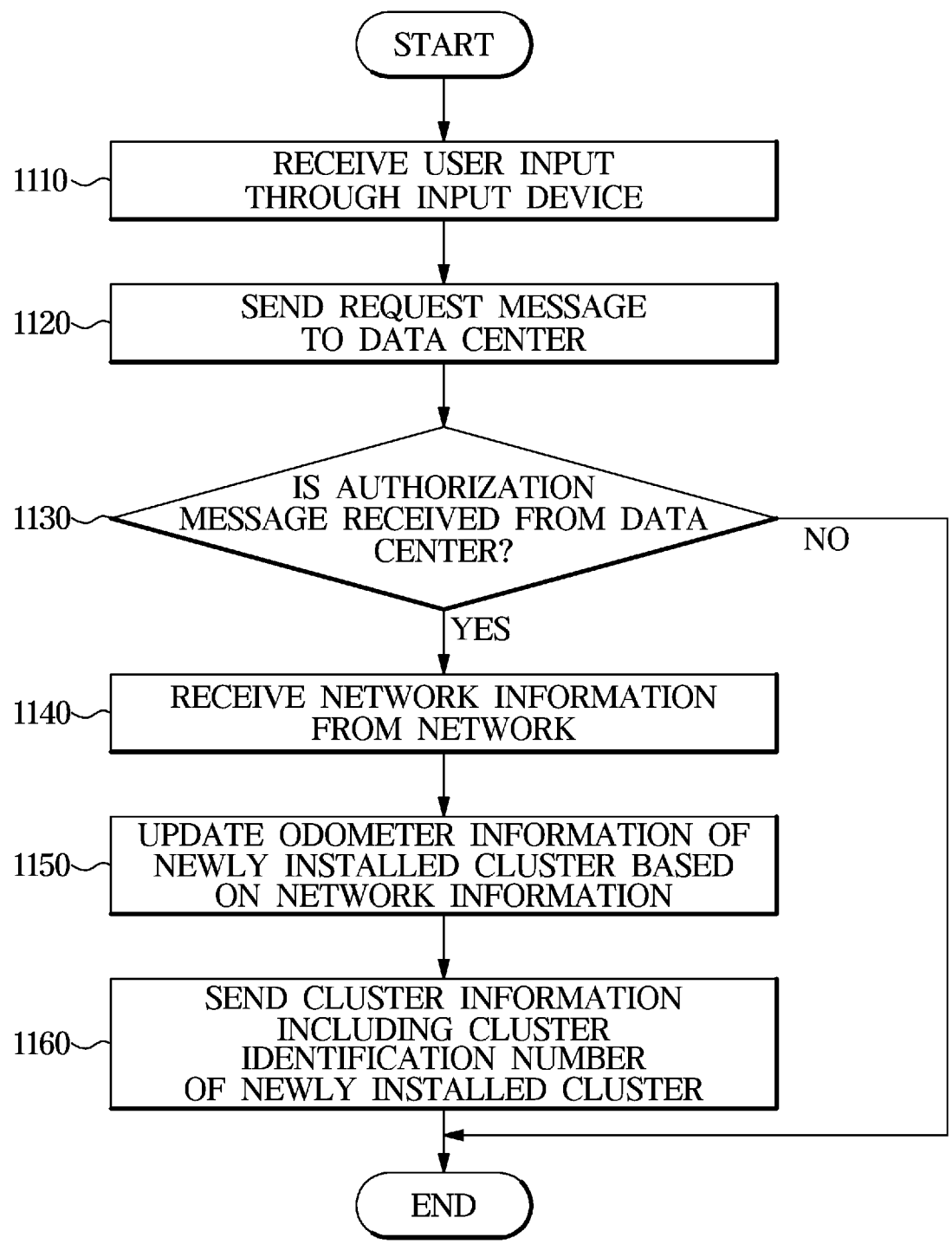
FIG. 9 is a flowchart illustrating an occasion when a cluster is replaced in a method for controlling a vehicle.

FIG. 9 is a flowchart illustrating an occasion when a cluster is replaced in a method for controlling a vehicle, in one form of the present disclosure.

Referring to FIG. 9, the controller 330 of the vehicle 100 may receive an input of the user through the input device 310, in 1110. The controller 330 may receive an input of the user about user identification information of a user who replaces the cluster 310, the user's private key information, and a cluster identification number of a newly installed cluster through the input device 320.

The user who replaces the cluster 310 may be a person in charge of the service in a service center for the vehicle maker. The user identification information of the user is used to identify the user, and the user's private key information is information about a private key to change the cluster identification number, which is encrypted in a public key encryption method and allocated to the vehicle 100.

The user identification information and the user's private key information is stored and managed in the data center 500 for the vehicle maker. When the user identification information and the user's private key information entered through the input device 320 is sent to the data center 500 for the vehicle maker, the data center 500 may compare it with user identification information and user's private key information stored in the data center 500.

The controller 330 of the vehicle 100 may send a request message requesting authorization to replace the cluster 310 to the data center 500, in 1120. The request message may include the user identification information entered by the user, the user's private key information, and the cluster identification number of the newly installed cluster. In one form, the configuration of receiving an input of the user and sending the input of the user to the data center 500 may be implemented by telematics of the vehicle 100 or a communication terminal provided separately from the vehicle 100, which is able to send or receive data to or from the data center 500.

If the user identification number and the user's private key information in the request message match the user identification and the private key information stored in the data center 500, the data center 500 may send an authorization message giving authorization to replace the cluster 310 to the vehicle 100. Furthermore, if the information sent to the data center 500 match the information stored in the data center 500, the data center 500 may replace the cluster identification number allocated to the vehicle 100 with the cluster identification number of the newly installed cluster included in the request message. Accordingly, the authorization message may include the cluster identification number of the newly installed cluster to be allocated to the vehicle 100.

When receiving the authorization message from the data center 500 (yes in 1130), the controller 330 of the vehicle 100 may receive network information from the network 400, in 1140. Specifically, the controller 330 of the vehicle 100 may control the communication device 340 to receive the network information of the network 400 from at least one other vehicle included in the network 400. The controller 330 of the vehicle 100 may receive the network information before sending or receiving a message to or from the data center 500.

The controller 330 of the vehicle 100 may update the odometer information of the newly installed cluster based on the received network information, in 1150. The newly installed cluster may generally have '0 km' as the odometer information, and may not reflect an actual accumulated distance traveled by the vehicle 100.

Accordingly, the controller 330 may receive the network information having actual odometer information of the vehicle 100 from at least one other vehicle in the network 400 and update odometer information of the newly installed cluster based on the received network information, thereby having an actual accumulated distance reflected on the newly installed cluster.

The controller 330 of the vehicle 100 may send the cluster information including a cluster identification number of the newly installed cluster over the network 400, in 1160. Specifically, the controller 330 of the vehicle 100 may control the communication device 340 to send the cluster information including a cluster identification number of the newly installed cluster over the network 400.

The controller 330 may create cluster information to include the cluster identification number of the newly installed cluster allocated to the vehicle 100 through the authorization message and send the created cluster information to other vehicle included in the network 400, so that the network information 450 may be updated based on the cluster information of the vehicle 100.

Accordingly, even when the cluster 310 of the vehicle 100 is replaced, the vehicle 100 may have a newly installed cluster indicate an actual accumulated distance traveled by the vehicle 100 by reflecting actual odometer information of the vehicle 100 and continuously share odometer information of the newly installed cluster in the network 400.

Meanwhile, the forms of the present disclosure may be implemented in the form of recording media for storing instructions to be carried out by a computer. The instructions may be stored in the form of program codes, and when executed by a processor, may generate program modules to perform operation in the forms of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

According to forms of the present disclosure, a vehicle and method for controlling the same may prevent manipulation of odometer information of the vehicle by creating a network with at least one other vehicle and sharing odometer information of a cluster with the other vehicle in the network without need for an extra server.

Several forms have been described above, but a person of ordinary skill in the art will understand and appreciate that various modifications can be made without departing the scope of the present disclosure. Thus, it will be apparent to those ordinary skilled in the art that the true scope of technical protection is only defined by the present disclosure.

What is claimed is:

1. A vehicle comprising:
    a cluster configured to obtain odometer information updated as the vehicle runs;
    a communication device configured to form a network with at least one other vehicle;
    a controller configured to:
        generate first cluster information including a vehicle identification number, a cluster identification number, and odometer information,
        send the first cluster information to the at least one other vehicle using the network; and
        control the communication device to receive second cluster information of the at least one other vehicle; and
    a storage configured to:
        store network information including the first cluster information of the vehicle and the second cluster information of the at least one other vehicle, and
        store a cluster identification number of the cluster encrypted by a public key encryption method and allocated to the vehicle,
    wherein the controller is configured to send the first cluster information to the at least one other vehicle when the cluster identification number of the cluster matches a previously stored cluster identification number in the storage.

2. The vehicle of claim 1, wherein the network information is shared between the vehicle and the at least one other vehicle included in the network.

3. The vehicle of claim 2, wherein the controller is configured to periodically send the first cluster information updated as the vehicle runs to the at least one other vehicle to update the network information.

4. The vehicle of claim 2, wherein the controller is configured to control the communication device to periodically receive the second cluster information of the at least one other vehicle updated as the at least one other vehicle runs from the at least one other vehicle.

5. The vehicle of claim 4, wherein the controller is configured to update the network information based on the received second cluster information of the at least one other vehicle when a cluster identification number in the received second cluster information of the at least one other vehicle matches the cluster identification number of the at least one other vehicle in the stored network information.

6. The vehicle of claim 5, wherein the controller is configured to update the network information based on the received second cluster information of the at least one other vehicle when odometer information in the received second cluster information of the at least one other vehicle has a higher value than odometer information of the at least one other vehicle in the stored network information.

7. The vehicle of claim 6, wherein the controller is configured to update odometer information of the cluster based on network information received from the at least one other vehicle when the odometer information of the vehicle in the network information received from the at least one other vehicle does not match the odometer information of the cluster.

8. The vehicle of claim 2, further comprising:
    an input device configured to receive an input of a user,
    wherein the controller is configured to control the communication device and to send a request message including user identification information, private key information of the user, and a cluster identification number of a newly installed cluster received through the input device to a data center when the cluster is replaced.

9. The vehicle of claim 8, wherein when receiving an authorization message from the data center indicating that user identification information and private key information stored in the data center match the user identification information and the private key information included in the request message, the controller is configured to control the communication device to receive the network information from the at least one other vehicle.

10. The vehicle of claim 9, wherein the controller is configured to update odometer information of the newly installed cluster based on the network information when receiving the network information from the at least one other vehicle.

11. The vehicle of claim 9, wherein the controller is configured to control the communication device and to send cluster information including the cluster identification number of the newly installed cluster to the at least one other vehicle so as to update the network information.

12. A method for controlling a vehicle, the method comprising:
    updating odometer information as the vehicle runs;
    forming a network between the vehicle and at least one other vehicle;
    generating first cluster information including a vehicle identification number, a cluster identification number, and odometer information of the vehicle;
    sending the first cluster information to the at least one other vehicle using the network;
    receiving second cluster information of the at least one other vehicle using the network; and storing network information including the first cluster information of the vehicle and the second cluster information of the at least one other vehicle, wherein sending the first cluster information comprises:

storing a cluster identification number encrypted in a public key encryption method and allocated to the vehicle, and sending the first cluster information to the at least one other vehicle when the cluster identification number of the cluster matches a previously stored cluster identification number of the cluster.

13. The method of claim 12, wherein sending the first cluster information comprises: periodically sending the first cluster information updated as the vehicle runs to the at least one other vehicle in order to update the network information.

14. The method of claim 12, wherein receiving the second cluster information of the at least one other vehicle comprises: periodically receiving the second cluster information of the at least one other vehicle updated as the at least one other vehicle runs from the at least one other vehicle.

15. The method of claim 14, further comprising:

updating the network information based on the received second cluster information of the at least one other vehicle when a cluster identification number in the received second cluster information of the at least one other vehicle matches the previously stored cluster identification number of the at least one other vehicle in the network information.

16. The method of claim 15, further comprising:

updating the network information based on the received second cluster information of the at least one other vehicle when odometer information in the received second cluster information of the at least one other vehicle has a higher value than previously stored odometer information of the at least one other vehicle in the network information.

17. The method of claim 16, further comprising:

updating odometer information of the cluster based on network information received from the at least one other vehicle when odometer information of the vehicle in the network information received from the at least one other vehicle does not match the odometer information of the cluster.

18. The method of claim 12, further comprising:

receiving an input of a user;

sending a request message including user identification information, private key information of the user, and a cluster identification number of a newly installed cluster to a data center when the cluster is replaced;

when receiving an authorization message from the data center indicating that user identification information, private key information of the user, and a cluster identification number stored in the data center match the user identification information, the private key information of the user, and the cluster identification number included in the request message, receiving the network information from the at least one other vehicle; and when receiving the network information from the at least one other vehicle, updating odometer information of the newly installed cluster based on the network information.

* * * * *